FIG.I

United States Patent Office 3,466,525
Patented Sept. 9, 1969

3,466,525
CONTROL CIRCUITS FOR STATIC CONVERTORS
John Desmond Ainsworth, Stafford, England, assignor to The English Electric Company Limited, London, England, a British company
Filed May 5, 1967, Ser. No. 636,398
Claims priority, application Great Britain, May 6, 1966, 20,279/66
Int. Cl. H02m 7/48
U.S. Cl. 321—5                                                  12 Claims

ABSTRACT OF THE DISCLOSURE

A circuit for controlling the application of firing pulses to a controlled device in a static converter employed for example, in H.V.D.C. schemes. The circuit comprises an oscillator for developing these pulses and having an output frequency dependent on an input signal which is a function of any difference between the actual and desired values of a selected quantity possesed by the A.C. or the D.C. system whereby to influence the pulse frequency and control the firing angle "α" of the controlled devices in such a sense as to reduce the difference towards zero.

---

This invention relates to control circuits for static converters, that is, electrical apparatus for effecting conversion between A.C. and D.C.

From one aspect, the present invention consists in a circuit for controlling the application of firing pulses to a controlled device in a static convertor for effecting conversion of electrical energy between A.C. and D.C. systems, comprising an oscillator for developing said pulses and having an output frequency dependent on the magnitude of an input signal, said signal being a function of any difference between the actual and desired values of a selected quantity possessed by either of said systems whereby to influence the frequency of said pulses relative to the A.C. system and control the firing angle "α" in such a sense as to reduce said difference towards zero, the A.C. system having such a high inertia that its frequency and phase are substantially unaffected by any changes in the operating power of the convertor.

The firing angle "α" is defined as the amount, in electrical degrees, by which the instant of firing any particular controlled device, e.g. a mercury-pool valve or a thyristor, is delayed following the instant of natural commutation of the valve, that is, the instant at which its anode potential rises above its cathode potential. The mean D.C. voltage of the convertor is approximately proportional to cos α.

Since the A.C. system is of high power, possessing almost infinite, or at least very high inertia, its frequency and phase are negligibly affected by the convertor, as mentioned above; the oscillator frequency does not therefore affect the A.C. system, the pulse repetition frequency of this oscillator being equal, in the steady state, to the fixed frequency of the A.C. system.

Preferably, the circuit is arranged to control a plurality of valves in a multi-phase convertor, the output from the oscillator being applied to the control electrodes of the appropriate valves through a ring counter, the pulse repetition frequency being equal, in this case, to a multiple of the fixed frequency equal to the number of phases or the "pulse number" of the convertor.

In addition, the firing angle "α" is conveniently restricted between minimum and maximum limits by control circuits which are operable to suppress reset or effect forcible reset of the oscillator, so as to prevent conversion failure in extreme conditions and maintain synchronism if the control loop saturates.

One of the principal advantages of this invention is that whereas the A.C. supply voltage to the convertor may have substantial harmonic components or, in multi-phase circuits, have differing values for each phase (either in magnitude or relative phase), individually, the positions of the firing pulses are unaffected by these conditions since they are generated in dependence on the frequency of a freely-running oscillator and are thus not directly influenced by such distortion in the A.C. supply.

The invention is of particular utility in large convertor installations, e.g. those employed in H.V.D.C. transmission or large rolling mills, since the effect of harmonics may be considerable in these instances, and also the A.C. system impedances may not be negligible.

In order that the invention may be fully understood, one embodiment thereof will now be described with reference to the accompanying drawings, in which.

Figure 1:
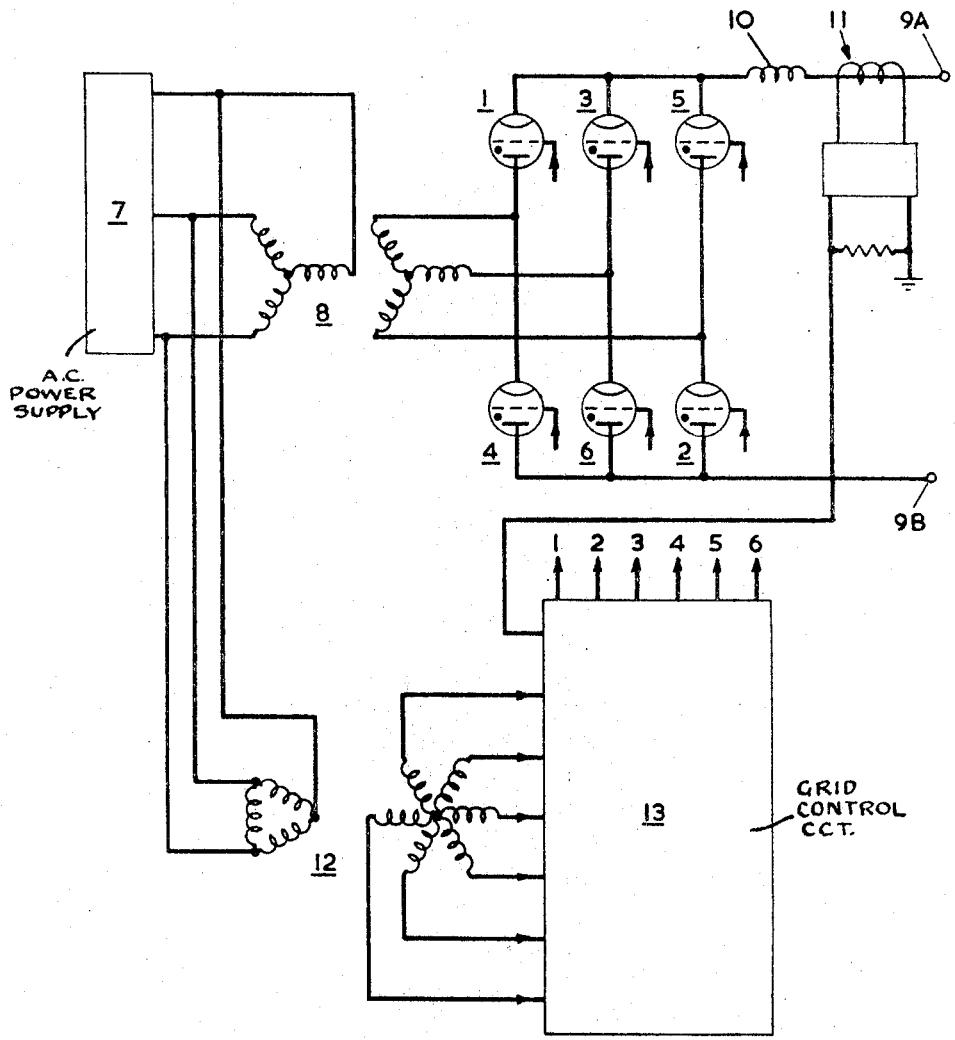
FIGURE 1 is a schematic diagram of an overall six-phase convertor circuit.
Figure 2:
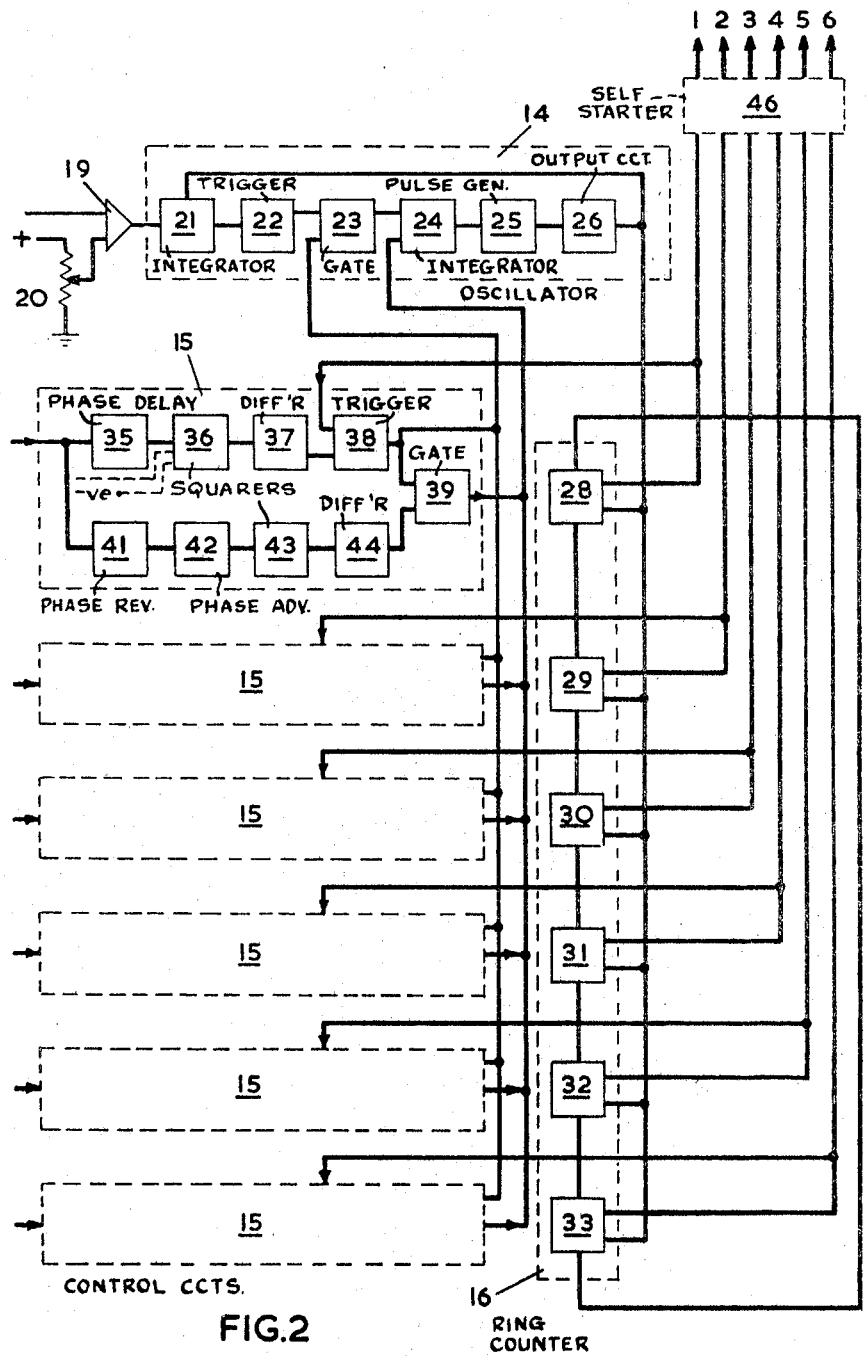
FIGURE 2 is a block diagram of the firing pulse control circuit shown in FIGURE 1.

FIGURES 3(a) to 3(e) are fixed waveforms obtained at various positions in the circuits shown in FIGURES 1 and 2, i.e. those which are independent of convertor operation; and FIGURES 4(a) to (d), to 6(a) to (d) are waveforms obtained at various positions in the control circuit shown in FIGURE 2 under three different conditions of operation.

Referring now to FIGURE 1, there is shown a six-pulse convertor circuit having six controlled mercury-pool valves 1 to 6. More particularly, the circuit includes a three-phase A.C. power supply 7 the output of which is applied to a star-connected primary of a convertor transformer 8, the secondary windings of which are respectively connected to the anode-cathode junctions of series-connected valves 1 and 4, 3 and 6, and 5 and 2. The cathodes of valves 1, 3 and 5 are connected together to a D.C. terminal 9A through a smoothing reactor 10, and the anodes of valves 4, 6 and 2 are connected together to a D.C. terminal 9B. These terminals 9A and 9B may either be connected to a D.C. load (rectifier operation) or they may be supplied from an external D.C. source (inverter operation). A D.C. current transformer 11 is coupled to the line adjacent the terminal 9A.

The output from the A.C. power supply 7 is also applied to a delta-connected primary winding of a voltage transformer 12, the secondary winding being connected in diametral star so as to provide a six-phase input to a grid control circuit 13 for the valves.

Referring now to FIGURE 2, the control circuit 13 is shown in more detail. Basically, it comprises an oscillator 14, a firing-angle control circuit 15 for each phase which restricts the value of firing angle (α) in each cycle for each valve between two predetermined limits, and a ring counter 16.

The oscillator delivers short pulse outputs to drive the ring counter 16 at a repetition rate equal, in the steady state, to six times the frequency of the convertor A.C. system. In particular, the oscillator is arranged so that its pulse repetition frequency is controlled by the output voltage from a D.C. amplifier 19, the pulse repetition frequency being proportional to this output voltage which in turn is proportional to the difference between a demanded current set by a potentiometer 20 and the actual convertor D.C. current output determined by the current transformer 11. The relative phase of the pulses is such as to cause the appropriate valves to be fired at a firing angle dependent on the D.C. load resistance. Thus, in the event of the actual current being larger or smaller than that demanded the resulting error signal is amplified by amplifier 19 to decrease or increase the oscillator frequency thereby to decrease or increase the firing angle α and correct this current error.

The oscillator therefore behaves as an integral-of-error system since in the steady state, provided the control loop is not saturated, the output from the amplifier 19 is always constant with constant A.C. frequency of the convertor system.

The oscillator actually comprises a Miller integrator 21 which generates a positive-going ramp voltage rising at a rate proportional to its input voltage and an Eccles-Jordan bistable trigger circuit 22 which changes state at a predetermined level of this ramp voltage, the output from this trigger circuit being fed through an AND circuit 23 and an OR circuit 24, provided that these circuits are correctly gated (as described below), to a pulse generator 25. This pulse generator supplies an output stage 26 which in turn feeds back its output pulse to the input of the Miller integrator 21, forcibly resetting the output of this circuit to zero voltage, and additionally drives the ring counter 16 so that an output from the appropriate stage 28–33 is applied to the grid of the controlled valve connected to that stage.

As mentioned above, the control circuit 15 restricts the value of firing angle (α) of its associated valve between two predetermined limits, this circuit being designed to avoid malfunction of the convertor in the event of major transient disturbances such as would tend to cause permanent loss of synchronism between the oscillator and the A.C. system. The reason for such restriction of the firing angle is twofold, (a) α must normally be positive to ensure that the anode voltage is positive at the instant of firing, a typical value being α=5° (rectifier ceiling pulses), and (b) the maximum value of α must be restricted to prevent commutation failure during inversion. For example, a value of α=170° (inversion limit pulse) might be permitted, having a time (margin angle) of 10° electrical before the anode voltage becomes positive to its cathode to enable the valve to de-ionise.

In particular, each control circuit 15 comprises two parallel branches fed from an associated phase of the transformer 12, one branch deriving the α min. pulse and the other deriving the α max. pulse. The said one branch comprises a phase delay circuit 35 (e.g. 5° delay) followed by an amplifier-limiter (squarer) 36. A differentiator 37 converts the leading and trailing edges of the square wave from squarer 36 into short pulses and transmits only the positive-going pulses, these pulses occurring at a time corresponding to the firing angle of 5°. In turn, an Eccles-Jordan bistable trigger circuit 38 is connected both to receive the output pulse from the differentiator 37 and the firing pulse for the associated valve, the former pulse performing a "set" function on this trigger and the latter pulse performing a "reset" function, and the output from this trigger circuit 38 is applied to one input of an AND circuit 39 and as a "reset suppression pulse" for the oscillator to one input of the AND circuit 23, therein. Any output from the AND circuit 39 is effective as a "forced reset" on the oscillator 14.

The other input to the AND circuit 39 is supplied by the other branch of the control circuit 15 which comprises a phase reversal circuit 41 followed by a phase advance circuit 42 (e.g., 10° advance resulting in α max.=170°), the output being fed to an amplifier-limiter 43 and a differentiator 44, only the positive-going pulses being transmitted to the AND circuit 39.

The function of the oscillator 14 and the ring counter 16 is therefore to fire the controlled valves 1 to 6 (in the order shown) at appropriate instants between α min. and α max. necessary to maintain the desired output current from the converter, and the function of the control circuit is twofold (a) forced reset, whereby if any circuit 39 has an output, the pulse generator 25 is triggered-on whether or not the output voltage of the integrator 24 has risen to the critical level of the trigger circuit 22, and (b) suppression of reset, whereby, if there is no output from any trigger circuit 38, the circuit 22 is unable to trigger-on the pulse generator 25, it being noted that under this condition the "forced reset" pulse from AND circuit 39 is also inhibited.

The operation of these circuits will be better understood by reference to FIGURES 3(a) to (e) and FIGURES 4(a) to (d) to 6(a) to (d) which show waveforms obtained at different parts of these circuits under various conditions of operation.

Figure 3:
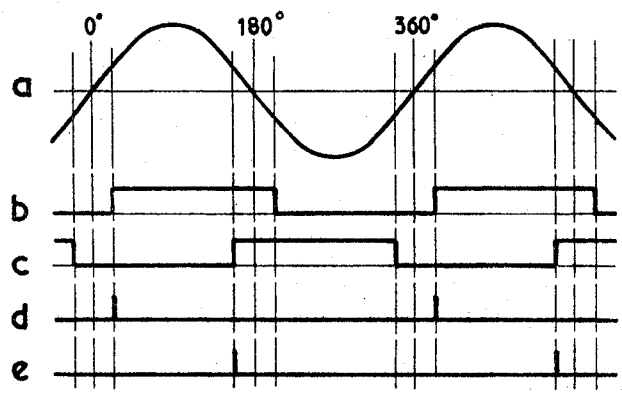

Referring firstly to FIGURE 3, there are shown the fixed waveforms, i.e. those which are independent of the converter operation. These are drawn for a particular control circuit 15; other such waveforms exist in the remaining control circuits, displaced at successive phase angles of 60°. FIGURE 3(a) shows the A.C. supply waveform applied to the said control circuit, 3(b) shows the output from its squarer 36 and 3(c) shows the output from its squarer 43, whilst 3(d) shows the α min. pulse at the output of its differentiator 37 and 3(e) shows the α max. pulse at the output of its differentiator 44.

Figure 4:
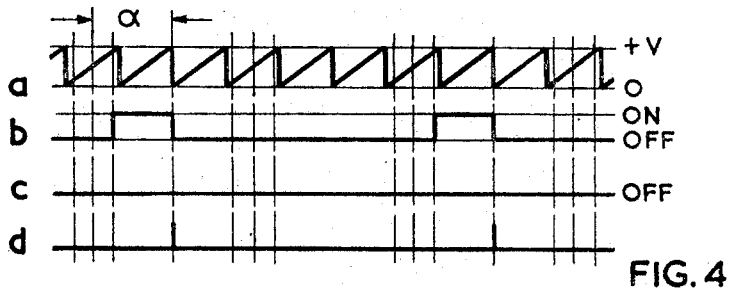

FIGURE 4 is drawn on the same time scale and shows normal operation under closed-loop control, there being a constant output voltage from amplifier 19 having a value corresponding to the free-running frequency of the oscillator, i.e. six times the A.C. supply frequency. More particularly, FIGURE 4(a) shows the ramp output from the Miller integrator 21, the trigger level of circuit 22 being +V volts and α ≈80°. The bistable trigger circuit 38 (FIGURE 4(b) is earlier gated-on by the α min. pulse (FIGURE 3(d)) and is reset by the output grid pulse from the output stage 26 which occurs substantially simultaneously with the operation of circuit 22 at α=80°. There is no forced reset (FIGURE 4(c) since the pulse inputs to AND circuit 39 are not simultaneous.

Figure 5:
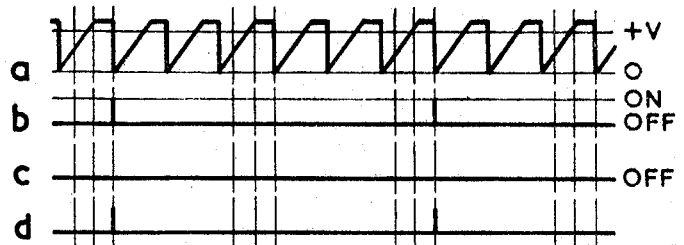

FIGURE 5 shows operation at the α min. (α=5°) limit, the output from amplifier 19 being higher than the normal value, e.g. because the demanded D.C. output current cannot be reached even at maximum converter D.C. voltage. FIGURE 5(a) shows the output from the integrator 21 which quickly rises above the trigger level at +V and saturates. An input is applied to the AND circuit 23 at the instant at which the integrator traverses this trigger level and the other input to this circuit is applied at α min. (FIGURE 5(b)) whereupon an output (FIGURE 5(d)) is developed at the output stage 26 at α=5° and the bistable circuit 38 is reset. Again there is no forced reset (FIGURE 5(c)).

Figure 6:
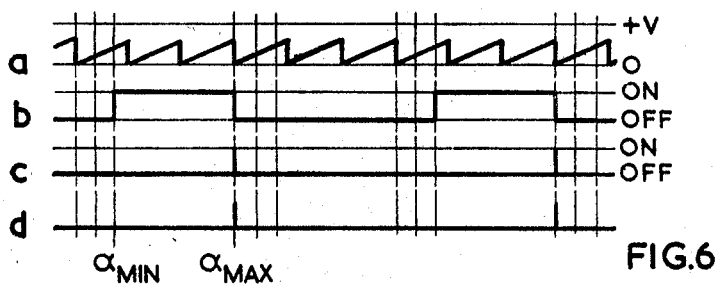

FIGURE 6 shows operation at the α max. (α=170°) limit, the output from amplifier 19 being lower than the normal value, e.g. because maximum possible D.C. line voltage is required as an inverter (the D.C. voltage negative). FIGURE 6(a) shows the output from integrator 21 which does not attain the trigger level. In this instance, the trigger circuit 38 (FIGURE 4(b)) is gated-on by the α min. pulse and upon the occurrence of the α max. pulse (FIGURE 3(e)) the AND circuit 39 is opened and a "forced reset" pulse (FIGURE 6(c)) is applied to the OR circuit 24. Accordingly, the pulse generator 25 is triggered-on and an output (FIGURE 6(d)) is developed at the output stage 26, this pulse being fed back to reduce to zero the output voltage of the integrator 21.

It will thus be seen that under normal operation in loop control, the grid pulse timing is not influenced directly in any way by the A.C. voltage, except via the control loop, and that the action of the α min. and α max. pulses as end-stops is instantaneous, there being no overshoot. The grid pulses thus normally occur at equal intervals of 60°, and are independent of harmonics or asymmetry of the A.C. voltage. Moreover, the accuracy of the grid pulse spacing is substantially independent of the accuracy of the control system components. If α is at either of the limits, then the operation becomes dependent on the A.C. voltages.

The control circuit is not limited to the particular arrangement shown, and it is to be understood that many modifications may be made without departing from the scope of this invention.

For example, the α min. branch of the control circuit 15 may be modified by omitting the phase delay circuit 35 and applying the A.C. input direct to the amplifier limiter 36 together with a fixed negative D.C. signal as shown in dotted lines in FIGURE 2 so that this circuit 36 receives the sum of these two signals. The A.C. voltage itself is arranged normally to cross zero at a time corresponding to α=0° so that the effective zero crossing at the input to circuit 36 may be made to correspond to α min.=5°, as before, but if the A.C. voltage or frequency changes, the value of α min. changes such that the lowest value of anode-cathode voltage of the valve at its instant of firing (α=α min.) remains constant, independent of these changes.

In addition, the α max. branch of the control circuit may be modified so that, during inversion, a substantially constant de-ionization (margin) angle is provided for the valves under varying voltage and current conditions. This is evident where the impedance of the converter transformer 8 is not negligible. A circuit which is particularly suitable for providing such a constant margin angle is disclosed in our co-pending patent application No. 636,396 filed May 5, 1967 entitled "Improvements in Static Inverter Control Circuits," the circuit being such that α max. progressively falls with increasing current.

Further, although the feedback to amplifier 19 has been described with reference to D.C. output current control, this signal may alternatively be D.C. voltage, D.C. power, the speed of a D.C. motor controlled by the converter or any other convenient quantity.

A further modification involves the interposition of a circuit 46 in the output leads from the ring counter 16 as shown in dashed lines in FIGURE 2. This circuit is designed so as to render the convertor self-starting which, for the double-way convertor shown, must involve the simultaneous conduction of two valves in series. In one form, the circuit 46 includes six OR circuits each connected to the grid of a corresponding valve and having two inputs from adjacent outputs from the ring counter, e.g. the OR circuit for valve 1 would have inputs from the ring counter outputs 1 and 2, the OR circuit for valve 2 would have inputs from the ring counter outputs 2 and 3, and so on. In another form the circuit 46 includes six bistable circuits each connected to the grid of a corresponding valve and which is set and reset, respectively, by two adjacent outputs from the ring counter, e.g. the bistable circuit for valve 1 would be set by the ring counter output 1 and reset by the ring counter output 2, the bistable circuit for valve 2 would be set by the ring counter output 2 and reset by the ring counter output 3, and so on, the grid pulse in each case therefore being of rectangular waveform having a duration of 60°. Alternatively, each grid pulse may be 120° by arranging each bistable reset signal to be obtained from a ring counter stage displaced by two positions instead of one.

Although this invention has been described with reference to a three phase two-way (six pulse) convertor, it will be appreciated that the invention is equally applicable to an m-phase n-way convertor where m and n is any digit, including one, and although reference has been made throughout to grid-controlled valves, e.g. mercury-pool valves, it is to be understood that thyristors could equally well be employed.

In addition, the oscillator control is not necessarily determined by a D.C. quantity, as described, but alternatively the control may be dependent on an A.C. system quantity, e.g. A.C. power or phase-angle, this quantity first being converted into a D.C. signal for controlling the oscillator.

I claim:
1. A circuit for controlling the application of firing pulses to a controlled device in a static convertor for effecting conversion of electrical energy between A.C. and D.C. systems, comprising
   sensing means for monitoring a selected quantity possessed by either of said systems
   comparison means for comparing the actual monitored value of the quantity with a like quantity possessing the desired value whereby to derive an output signal representative of any difference between said values,
   an oscillator for developing said firing pulses and having an output frequency dependent on the value of said signal which is operative to influence the frequency of the pulses relative to the A.C. system and control the firing angle "α" in such a sense as to reduce towards zero the difference between the said values, and
   a control circuit for inhibiting the development of an output pulse from the oscillator in advance of a predetermined minimum firing angle "α" min., and enforcing an output pulse from the oscillator at a predetermined maximum firing angle "α" max., in the absence of a control signal therefor occurring between these limits.

2. A circuit according to claim 1, wherein the said selected quantity is possessed by the D.C. system.

3. A circuit according to claim 2, wherein the control circuit includes
   a bistable element operable to assume one state in response to a signal produced at said minimum firing angle and to assume its other state in response to an output pulse from the oscillator, and
   an AND gate for developing an output in response to a signal produced at said maximum firing angle whilst the bistable element assumes its one state, the oscillator being inhibited from developing its normal output during the period in which the bistable element assumes its other state and the output from the AND gate being effective to enforce the development of an output pulse from the oscillator.

4. A circuit according to claim 3, wherein the control circuit includes
   first means for receiving an alternating signal from the A.C. system and imparting a phase lag thereto, and
   second means for detecting the instant at which the delayed signal traverses the zero datum whereby to develop at that instant the said signal occurring at the minimum firing angle.

5. A circuit according to claim 3, wherein the control circuit includes
   first means for receiving an alternating signal from the A.C. system and adding to it a negative D.C. signal, and
   second means for detecting the instant at which the resultant signal traverses the zero datum whereby to develop at that instant the said signal occurring at the minimum firing angle.

6. A circuit according to claim 3, wherein the control circuit includes
   first means for receiving an alternating signal from the A.C. system, inverting the signal and imparting a phase advance thereto, and
   second means for detecting the instant at which the delayed signal traverses the zero datum whereby to develop at that instant the said signal occurring at the maximum firing angle.

7. A circuit according to claim 2, wherein the oscillator comprises
   a bistable element operable to assume one state in response to said input signal attaining a predetermined magnitude and to assume its other state in response to an output pulse from the oscillator,
   an AND gate connected to both this element and the bistable element in the control circuit for producing a said output pulse in response to both elements assuming their one states, and an auxiliary circuit for producing a said output pulse in response to an output from the AND gate in said control circuit.

8. A circuit according to claim 7, wherein the auxiliary circuit comprises an OR gate connected to the AND gates in both the oscillator and the control circuits.

9. A circuit for controlling the application of firing pulses to a controlled device in a static convertor for effecting conversion of electrical energy between A.C. and D.C. systems in a high voltage D.C. transmission scheme, comprising sensing means for monitoring a selected quantity of the D.C. system comparison means for comparing the actual monitored value of this quantity with a like quantity of the desired value whereby to derive an output signal representative of any difference between said values, an oscillator for developing said firing pulses and having an output frequency dependent on the value of said signal which is operative to influence the frequency of the pulses relative to the A.C. system and control the firing angle "$\alpha$" in such a sense as to reduce towards zero the difference between the said values, the pulse repetition frequency of the oscillator being, in the steady state, equal to the fixed frequency of the A.C. system, and the A.C. system possessing such a high inertia that its frequency and phase are substantially unaffected by any changes in the operating power of the convertor, and a control circuit for inhibiting the development of an output pulse from the oscillator in advance of a predetermined minimum firing angle "$\alpha$" min., and enforcing an output pulse from the oscillator at a predetermined maximum firing angle "$\alpha$" max., in the absence of a control signal therefor occurring between these limits.

10. In a static convertor for effecting energy conversion between A.C. and D.C. systems designed for multiphase, $p$-pulse operation in an H.V.D.C. scheme and including $p$ controlled devices arranged in $m$-phase $n$-way configuration, a control circuit for controlling the application of firing pulses to the said devices, comprising sensing means for monitoring a selected quantity possessed by either of said systems, comparison means for comparing the actual monitored value of the quantity with a like quantity possessing the desired value whereby to derive an output signal representative of any difference between the values, an oscillator for developing said firing pulses, a $p$-stage ring counter operative to receive the output from the oscillator and respectively connected to the $p$ controlled devices whereby sequentially to apply the firing pulses to the said devices, the output frequency of the oscillator being dependent on the value of said output signal which is itself operative to influence the frequency of the pulses and control the firing angle "$\alpha$" in such a sense as to reduce towards zero the difference between the said values, and a control circuit for inhibiting the development of an output pulse from the oscillator in advance of a predetermined minimum firing angle, "$\alpha$" min., and enforcing an output pulse from the oscillator at a predetermined maximum firing angle, "$\alpha$" max., in the absence of a control signal therefor occurring between these limits.

11. A circuit according to claim 10, comprising a self-starting circuit for the convertor interposed between the controlled devices and the ring counter, the starting circuit being operable to fire $n$ devices simultaneously in any one of the $m$ phases.

12. A circuit according to claim 11, wherein the said selected quantity is possessed by the D.C. system.

References Cited

UNITED STATES PATENTS

| | | | |
|---|---|---|---|
| 3,197,691 | 7/1965 | Gilbert | 321—18 |
| 3,339,083 | 8/1967 | Uhlman | 321—2 X |
| 3,399,337 | 8/1968 | Stone | 321—5 |

JOHN F. COUCH, Primary Examiner

W. H. BEHA, Assistant Examiner

U.S. Cl. X.R.

321—13, 38, 47